Jan. 24, 1961
F. G. DENISON, JR
2,968,918
ROCKET MOTOR SHELL CONSTRUCTION
Filed Aug. 22, 1949
2 Sheets-Sheet 1
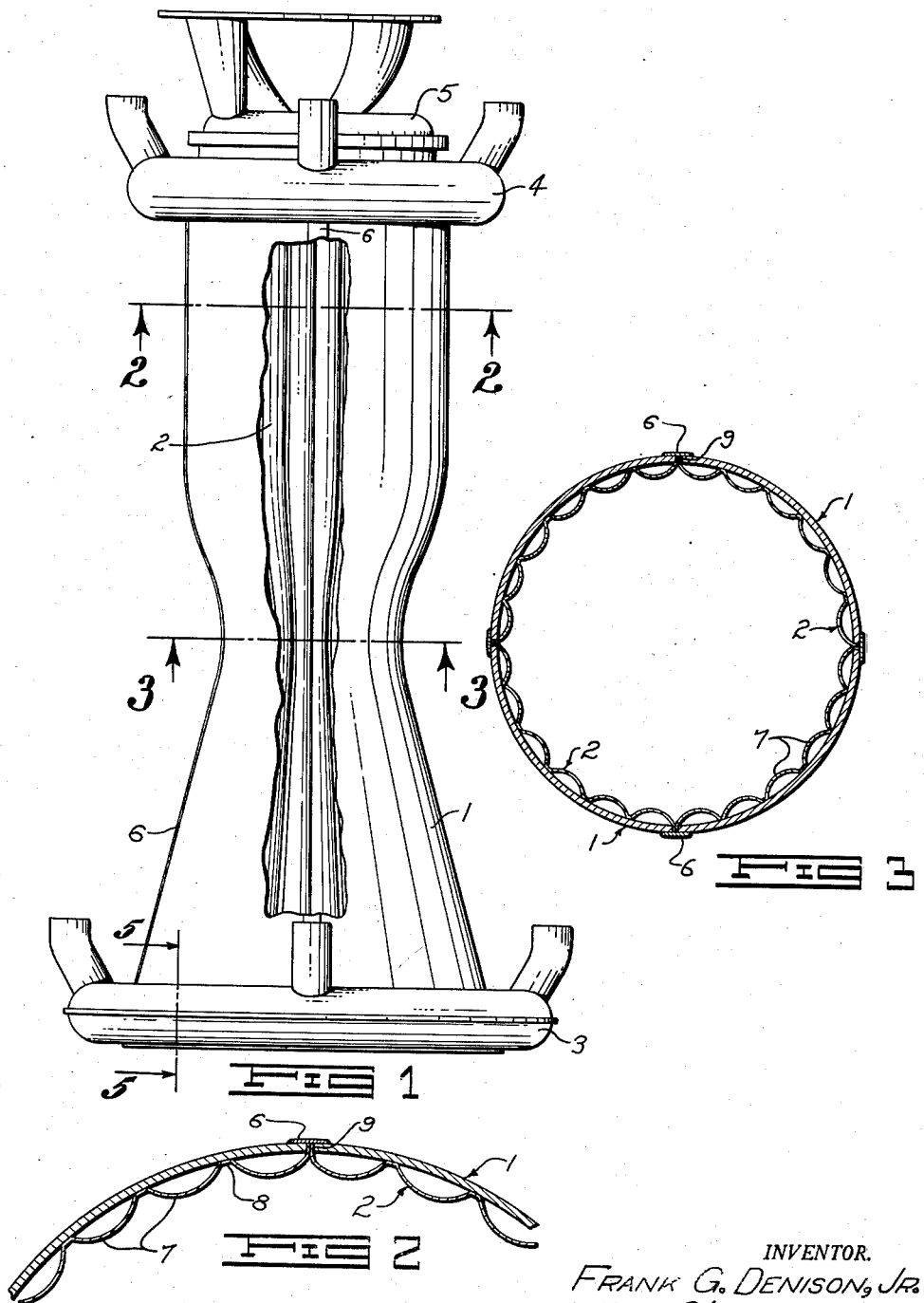
INVENTOR.
FRANK G. DENISON, JR.
BY
ATTORNEYS Jan. 24, 1961  F. G. DENISON, JR  2,968,918
ROCKET MOTOR SHELL CONSTRUCTION
Filed Aug. 22, 1949  2 Sheets-Sheet 2
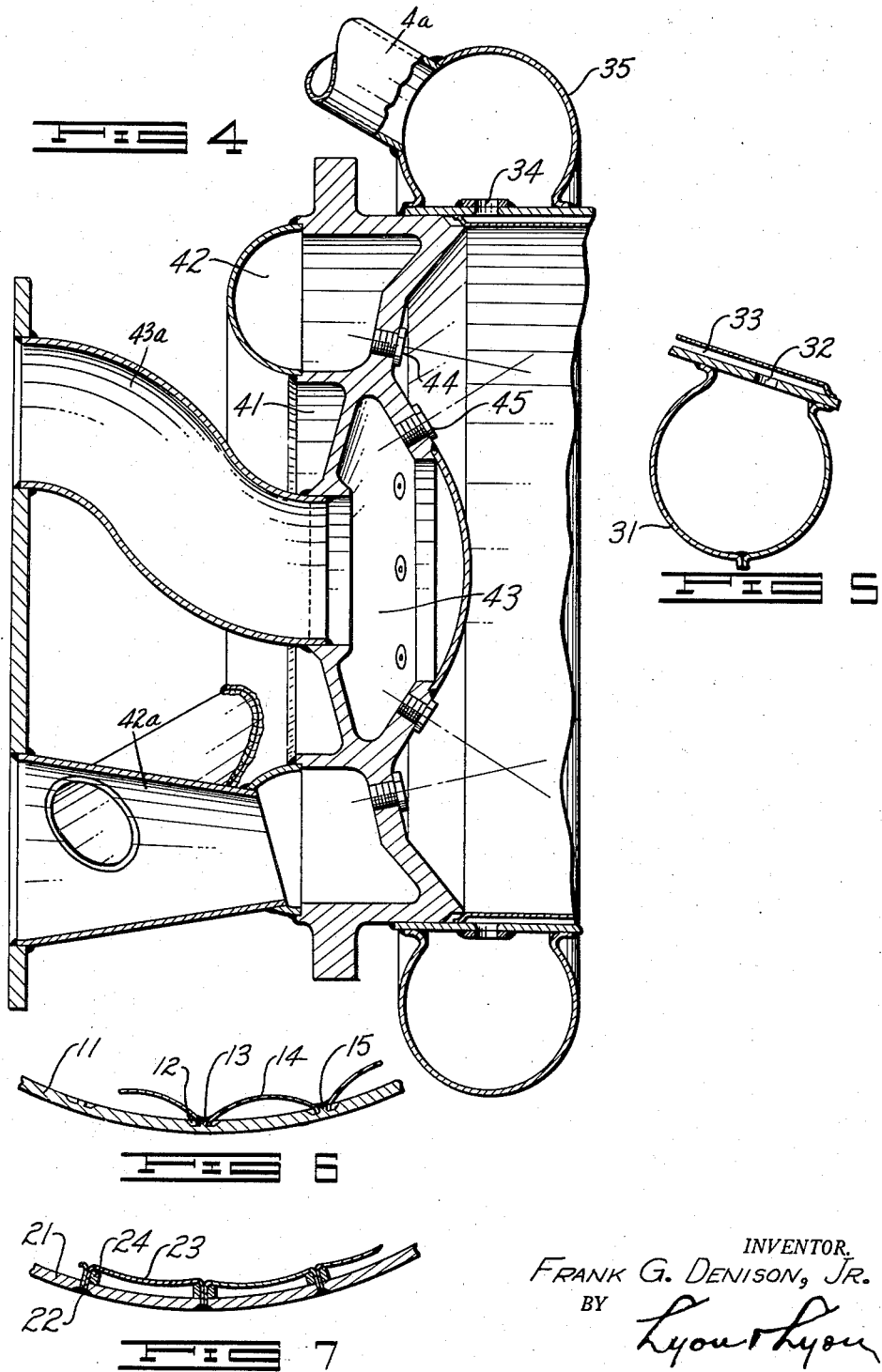
INVENTOR.
FRANK G. DENISON, JR.
BY
ATTORNEYS

United States Patent Office 2,968,918
Patented Jan. 24, 1961

2,968,918

ROCKET MOTOR SHELL CONSTRUCTION

Frank G. Denison, Jr., Pasadena, Calif., assignor to California Institute Research Foundation, Pasadena, Calif., a corporation of California Filed Aug. 22, 1949, Ser. No. 111,750

6 Claims. (Cl. 60—35.6)

This invention relates to rocket motor constructions, more particularly to the shell construction of liquid propellant rocket motors which are regeneratively cooled; i.e., a part of the propellant is employed to cool the motor. The chamber walls or shells of rocket motors of this type are called upon to carry two major loads: (1) the pressure resulting from the chemical reaction within the chamber and (2) the pressure of the propellant being fed between the inner and outer chamber walls in order to provide cooling of the walls and preheat the propellant before injection. Associated with the combustion within the chamber of the rocket motor are very high temperature gas products which transfer heat to the cooling propellant at excessive rates, rates that are much higher than those occurring in ordinary heat-transfer apparatus.

By reason of the excessive heat-transfer rate, the temperature difference across the metal wall which separates the combustion chamber from the coolant passages is very significant; whereas, in ordinary apparatus the high conductivity of the metal compared with the fluid film conductivities renders the temperature differential across the metal almost negligible. In a rocket motor the cooling fluid must be passed along the heated wall at unusually high velocities in order to prevent the coolant from boiling excessively in the boundary film, and since this velocity requires the expenditure of pumping power its value is held approximately to that which will allow some boiling in the fluid film. These boiling temperatures (which are high because of the pressures that are applied to inject the cooling propellant into the motor chamber) are then the operating temperature of the cooled side of the heated wall. When the large metal temperature differential is considered in addition, the heated side may easily be forced to operate at the melting point of the metal and therefore fail. In any event the strength of the metal comprising the wall is in almost all cases greatly reduced by the high temperature at which it must operate.

It will be seen that to satisfy the conditions contradictory requirements are imposed. That is, to carry the pressures with the reduced strengths effected by the temperatures, a thick wall is needed; to prevent the temperature from becoming excessive, a thin metal wall is desired. The contradiction becomes more and more serious as the size of the rocket motor is increased, because from the standpoint of strength the wall thickness must be increased as the linear dimensions of the rocket motor increase, while from a thermodynamic standpoint the thickness cannot exceed a fixed value regardless of size; i.e., the heat-transfer properties of the metal are independent of scale.

It is therefore a primary object of my invention to reconcile these contradictory requirements and provide a rocket motor shell construction in which the weight factor is reduced to a minimum while maintaining an optimum safety factor.

Second, to provide a rocket motor shell construction in which heat-transfer from the combustion chamber to the coolant is materially improved.

Third, to provide a rocket motor shell construction which may be made extremely large if desired, larger than has heretofore been practical in the construction of rocket motors of this type.

Fourth, to provide a rocket motor shell construction which involves an outer load-carrying shell of circular cross-section and a longitudinally corrugated thin-walled inner shell joined to the outer shell along circumferentially spaced lines to form parallel fluid courses, whereby the dimension which structurally controls the thickness of the inner shell is the width of the cooling passage, a dimension which may be arbitrarily chosen by the designer regardless of the over-all dimensions of the rocket motor.

Fifth, to provide a rocket motor shell construction which is relatively easy to construct and therefore relatively less expensive than rocket motors of other design.

With the above and other objects in view as may appear hereinafter, reference is directed to the accompanying drawings in which:

Figure 1 is a plan view of my rocket motor shell construction with a longitudinal section of the near side removed to expose a corresponding section of the remote inner side thereby to illustrate the corrugated inner wall thereof.

Figure 2 is a fragmentary transverse sectional view through 2—2 of Figure 1.

Figure 3 is a transverse sectional view through 3—3 of Figure 1.

Figure 4 is an enlarged sectional view of the forward end of the rocket motor showing particularly the injection manifold.

Figure 5 is a fragmentary sectional view through 5—5 of Figure 1 showing the intake manifold for the coolant.

Figure 6 is a fragmentary transverse sectional view similar to Figure 2 showing a modified form of construction of my rocket motor.

Figure 7 is a similar fragmentary sectional view also similar to Figure 2 showing a further modified form thereof.

Reference is directed particularly to my rocket motor shell construction as shown in Figures 1 through 4. In this construction the rocket motor comprises in general an outer shell 1, an inner shell 2, a coolant intake manifold 3 surrounding the outer shell adjacent to the rear or discharge end of the motor, a coolant outlet manifold 4 surrounding the forward end of the motor, and an injector head 5 covering the forward end of the motor.

The inner and outer shells define a combustion chamber located rearwardly of the injector head and a nozzle continuing from the combustion chamber, the nozzle involving a venturi throat and a substantially conical nozzle exit continuing therefrom.

The outer shell 1 is circular in cross section throughout its length and is formed of relatively thick-gauge metal. As will be brought out hereinafter, the outer shell carries the entire load exerted by the pressure of burning fuel within the combustion chamber as well as the pressure of coolant circulated between the inner and outer shells. It is preferable to construct the outer shell from four equal or quadrant sections welded together longitudinally and covered by reinforcing strips 6.

The inner shell 2 is divided into a series of corrugations 7. These corrugations extend longitudinally and vary in width in proportion to the change in diameter of the rocket motor; i.e., the segments are widest in the combustion chamber and at the nozzle exit and decrease in width in the region of the throat. The corrugations 7 form arches with their convex sides facing radially inward. Between the corrugations are formed ribs 8 which engage the outer shell and are secured thereto. One, perhaps the preferred, means of securing the ribs or lands 8 is to utilize a copper brazing technique in which the inner and outer shells are spot-welded together at points along the lands 8. Thereafter the copper bonding material in the form of wire is placed adjacent to the lands and the shells furnace heated until the bonding material fuses and is drawn between the shells by capillary action. This is a standard technique and does not, per se, form a part of this invention, except insofar as my invention lends itself to this type of construction.

It is preferred that the inner shell be divided into quadrants in the manner of the outer shell. In fact the extreme corrugations may terminate in flanges 9 which overlie the extremities of the quadrants forming the outer shell so that the quadrants of the outer shell are slightly spaced by the thickness of such flanges 9.

Alternative constructions are shown in Figures 6 and 7. In Figure 6 the outer shell 11 or quadrants of the outer shell are provided with adjacent pairs of grooves 12, each pair separated by a rib 13. In this case the inner shell is formed by a series of independent arched segments 14 the circumferential margins of which fit in the grooves 12 and bear against the sides of the ribs 13. The arches are welded to the outer shell 11 across the ribs 13 as indicated by 15.

In Figure 7 the outer shell 21 is provided with a series of longitudinal slits 22. The inner shell is formed by a plurality of strips 23, each of channel form, the flanges of which fit in the slits 22. The flanges are provided with reinforcing members 24 along their inner sides and the web of each flange is transversely curved or arched with its convex side facing radially outward. The extremities of the flanges are welded in their respective slits 22.

The nozzle extremity, that is, the rear extremity of the outer housing or shell is provided with an annular manifold 31 which is suitably welded to the outer shell. The outer shell is provided with perforations 32 which communicate between the manifold 31 and passageways 33 formed between the arches of the inner shell and the outer shell. These passages, it will be observed, are in parallel and extend to the forward or head end of the rocket motor. Here the outer shell is provided with ports 34 which open into an annular manifold 35. A coolant, preferably one of the combustion components, is introduced into the manifold 31 and discharged into the manifold 35.

While the present invention is directed primarily to the shell construction, an injector head structure 41 is shown in Figure 4 which, for the purposes of the present invention, may be considered as conventional. Said injector head structure contains chambers which receive the fuel components and deliver such fuel components through nozzles into the combustion chamber. In the present instance the injection head structure 41 is shown as defining an outer annular fuel component chamber 42 and a central fuel component chamber 43. One of these chambers may contain the fuel component used to effect cooling of the motor. The chambers 42 and 43 are provided with nozzles or jets 44 and 45, respectively, which are preferably arranged in pairs, the axes of which intersect in order that the fuel components will be brought forcibly into intimate contact.

The outlet manifold 4 is provided with one or more outlet tubes 4a which are connected by piping (not shown) to a conduit 43a leading to the central chamber 43 or to a conduit 42a leading to the outer chamber 42. In either case the other conduit is supplied with the other fuel component from a source (not shown).

In the operation of a rocket motor, utilizing my shell construction, a fuel component is supplied from a source (not shown) in the intake manifold 3 and is directed into parallel halves through the passages by the inner and outer shell to the outlet manifold 4. From here the fuel component is conducted by means (not shown) to either the outer or central chamber of the heat structure 41. Simultaneously the other fuel component is introduced into the other fuel chamber and both fuel components issue through the nozzles, impinge and burn in the combustion chamber.

My rocket motor shell construction is adapted to the use of many types of fuels, whether of the bi-propellant or of the mono-propellant type. The means extraneous to the shell structure whereby these fuels are introduced and injected vary. Inasmuch as they are not part of the present invention and are not necessary to the understanding of the shell construction, they are not shown.

The outer shell is circular in cross-section and carries the reaction pressure from the combustion in the rocket. Such a shape is the most efficient shape to carry the internal pressure. Furthermore the outer shell is maintained relatively cool by virtue of being protected from hot gases by the inner shell and the cooling fluid passing through the passages 33. The outer shell, therefore, may be arranged to operate at temperatures which are sufficiently low that its strength is not appreciably impaired; consequently its weight may be held to a minimum. The load due to the coolant pressure is relieved by the many lines of connection between the inner and outer shells so that very little increase in thickness of the outer shell is required to carry this load.

The heated inner shell, by reason of its division into internal flutes or corrugations, has the pressure carrying action of segments of small diametered tubes, and hence has high strength in proportion to thickness and weight. The axes of the inner shell segments are parallel to the direction of the hot gas flow and thus offer no unusual resistance to flow; also, the coolant passages thus formed allow the fluid to flow the shortest possible distance from one end of the motor to the other. This enables the pumping power required to move the liquid to be maintained at the lowest possible value.

Still further, the internal corrugation of the inner shell relieves the shell of all load from pressure within the combustion chamber itself. This enables the metal thickness of the inner shell to be reduced to a value so low that the restrictive metal temperature differences of previous conventional rocket motor constructions are no longer a factor. In fact, the metal comprising the inner shell may be so thin that it operates in its entirety at substantially the temperature of the coolant flowing in the passages 33.

It will be observed that the dimension which controls the thickness of the inner shell is the transverse radius of curvature of the cooling passage, that is, each segment of the inner shell. This dimension can be arbitrarily chosen by the designer regardless of the over-all size of the rocket motor. Substantial weight is saved because of the higher available strength of the metal and because of the basically more efficient shape of the inner shell segments.

Still further, even at the lines of attachment of the inner and outer shells conditions are favorable. In previous rocket motor designs such lines of attachment have caused local "hot spots" because cooling was impaired along these lines. This was due to the fact that in previous constructions the outer shell was comparatively thin and could not conduct the heat away fast enough. In the present construction, the outer shell being relatively thick, local regions of attachment are thoroughly cooled by conductivity to the fluid offered by the thick outer shell.

Actual tests have revealed that a very substantial reduction in weight is accomplished by the present rocket motor construction; for example, previous rocket motors of 20,000-lb. thrust have weighed not less than eight times the weight of the present motor of similar thrust.

Although I have shown and described particular embodiments of my invention I do not wish to be limited thereto but desire to include in the scope of my invention the constructions, combinations, and arrangements set forth in the appended claims.

I claim:
1. A rocket motor shell structure involving: a load-carrying shell of circular cross section and longitudinally contoured to define the combustion chamber and nozzle of a rocket motor; and a plurality of circumferentially spaced and mutually juxtaposed hollow archways disposed longitudinally within said shell to define therewith liquid-circulating passages, the radially inner surfaces of said archways being exposed to the gases burning within said chamber and nozzle.

2. A rocket motor shell construction involving: an outer load-carrying shell of circular cross section and shaped to define the combustion chamber and nozzle of a rocket motor, said outer shell being formed of sections joined together longitudinally; and an inner heat transfer shell conforming generally to the contour of the outer shell and likewise formed in sections corresponding to said sections of the outer shell, said inner shell sections divided into a plurality of segments of arch form each joined by its margins to said outer shell to form therewith a plurality of independent longitudinally extending coolant passages.

3. A rocket motor shell construction involving: an outer load-carrying shell of circular cross section and shaped to define the combustion chamber and nozzle of a rocket motor, said outer shell being formed of sections joined together longitudinally; an inner heat transfer shell conforming generally to the contour of the outer shell and likewise formed in sections corresponding to said sections of the outer shell, said inner shell sections divided into a plurality of segments of arch form each joined by its margins to said outer shell to form therewith a plurality of independent longitudinally extending coolant passages; and manifolds at the extremities of said rocket motor communicating with said coolant passage to cause parallel flow of coolant therethrough.

4. A rocket motor shell construction involving: an outer load-carrying shell of circular cross section and defining the combustion chamber and nozzle of a rocket motor, said shell having a plurality of longitudinally extending internal channels; and a plurality of heat transferring inner wall segment members adapted to fit with their margins in said channels and secured to said outer shell to define therewith a plurality of independent coolant courses.

5. A construction as set forth in claim 4 wherein: said channels extend only part way through said outer shell, and are disposed in pairs with an intervening rib adapted to form an abutment for the margins of adjacent segment members.

6. A construction as set forth in claim 4 wherein: said channels extend through said outer shell and the margins of adjacent segment members likewise extend through said shell and are permanently secured to each other and to said outer shell.

References Cited in the file of this patent

UNITED STATES PATENTS

| | | |
|---|---|---|
| 2,446,059 | Peterson et al. | July 27, 1948 |
| 2,523,656 | Goddard | Sept. 26, 1950 |
| 2,575,070 | Reed et al. | Nov. 13, 1951 |

FOREIGN PATENTS

| | | |
|---|---|---|
| 539,069 | Great Britain | Aug. 27, 1941 |
| 597,205 | Great Britain | Jan. 20, 1948 |